US011978588B2

(12) United States Patent
Paielli

(10) Patent No.: US 11,978,588 B2
(45) Date of Patent: May 7, 2024

(54) MULTI-STAGE SOLENOID ACTUATOR AND METHOD FOR OPERATION OF A MULTI-STAGE SOLENOID ACTUATOR

(71) Applicant: Dana Automotive Systems Group, LLC, Maumee, OH (US)

(72) Inventor: Perry M. Paielli, Sand Creek, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 467 days.

(21) Appl. No.: 17/444,941

(22) Filed: Aug. 12, 2021

(65) Prior Publication Data

US 2023/0052014 A1 Feb. 16, 2023

(51) Int. Cl.

| | |
|---|---|
| ***H01H 47/00*** | (2006.01) |
| ***H01F 7/06*** | (2006.01) |
| ***H01F 7/16*** | (2006.01) |
| ***H01F 27/02*** | (2006.01) |
| ***H01F 27/28*** | (2006.01) |

(52) U.S. Cl.

CPC ............... *H01F 7/064* (2013.01); *H01F 7/16* (2013.01); *H01F 27/02* (2013.01); *H01F 27/28* (2013.01)

(58) Field of Classification Search

None

See application file for complete search history.

(56) References Cited

U.S. PATENT DOCUMENTS

| | | | | |
|---|---|---|---|---|
| 4,809,742 | A * | 3/1989 | Grau | G01B 7/003 324/207.16 |
| 5,899,436 | A | 5/1999 | Holmes et al. | |
| 10,354,788 | B2 | 7/2019 | Bavisetti et al. | |
| 2009/0140188 | A1 | 6/2009 | Kunz et al. | |
| 2017/0074418 | A1* | 3/2017 | Liang | H01F 27/28 |
| 2019/0058318 | A1* | 2/2019 | Jazebi | H02H 3/08 |
| 2022/0254556 | A1* | 8/2022 | Munoz Sotoca | B66B 5/0093 |

* cited by examiner

*Primary Examiner* — Stephen W Jackson

(74) *Attorney, Agent, or Firm* — McCoy Russell LLP

(57) ABSTRACT

Methods and systems are provided for a multi-stage solenoid actuator. In one example, a system may include a solenoid actuator comprising a series of coils, the first coil enclosed by a first housing, the second and third coils enclosed by a second housing, and a plunger enclosed by the second housing. The method may include the first and second housing, and the plunger, moving in series, increasing the total displace of the actuator via single electric signal.

20 Claims, 7 Drawing Sheets

MULTI-STAGE SOLENOID ACTUATOR AND METHOD FOR OPERATION OF A MULTI-STAGE SOLENOID ACTUATOR

TECHNICAL FIELD

The present description relates generally to solenoid actuators, and more particularly, to a solenoid actuator with an extended range.

BACKGROUND AND SUMMARY

Many control systems utilize engage-disengage functionality. Solenoids are commonly used in these systems to convert electrical energy into mechanical energy to shift position of a movable mechanical member, for example, a plunger or spool in a spool valve.

A solenoid actuator is an inexpensive actuator, especially if the physical distance between engaged and disengaged is relatively small. However the inventors herein have recognized potential issues with such systems. As one example, for larger engage-disengage distances, a larger and more costly magnetic mechanism and/or additional current may be required. For example, range can be extended by more than one solenoid coil operating a single movable mechanical member, but this solution may be less desirable as multiple solenoids are controlled by separate electrical inputs, again increasing potential sources of degradation.

In one example, the issues described above may be addressed by a solenoid actuator, comprising; a first coil; a second coil; and a controller including non-transitory instructions stored in memory that cause the controller to apply a voltage to the first coil and draw the second coil toward the first coil, and then increase modulation of the voltage with the second coil engaged with the first coil to form a transformer. In this way, the ranged control of a solenoid actuator is extended.

As one example, the coils of the solenoid actuator are arranged in a series, wherein a first and second housing enclose first and second coils, respectively, and, the first housing is movable relative to the second housing. In one example, the second housing further includes a third coil, which is coupled to the second coil, and partially enclosed within the housing is a plunger coupled via a spring to the first housing. As one example, the first coil attracts the second coil via magnetic flux when unmodulated voltage is applied to the first coil. The electric current is then modulated, and via the transformer formed by the first and second coils, the plunger is attracted to the third coil. Once fully engaged, modulating current to the solenoid actuator may be reduced to a minimum holding level. In this way, the first and second housing, and the plunger, move in series, increasing the total travel of the actuator via the same electric signal, while the current draw to hold may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
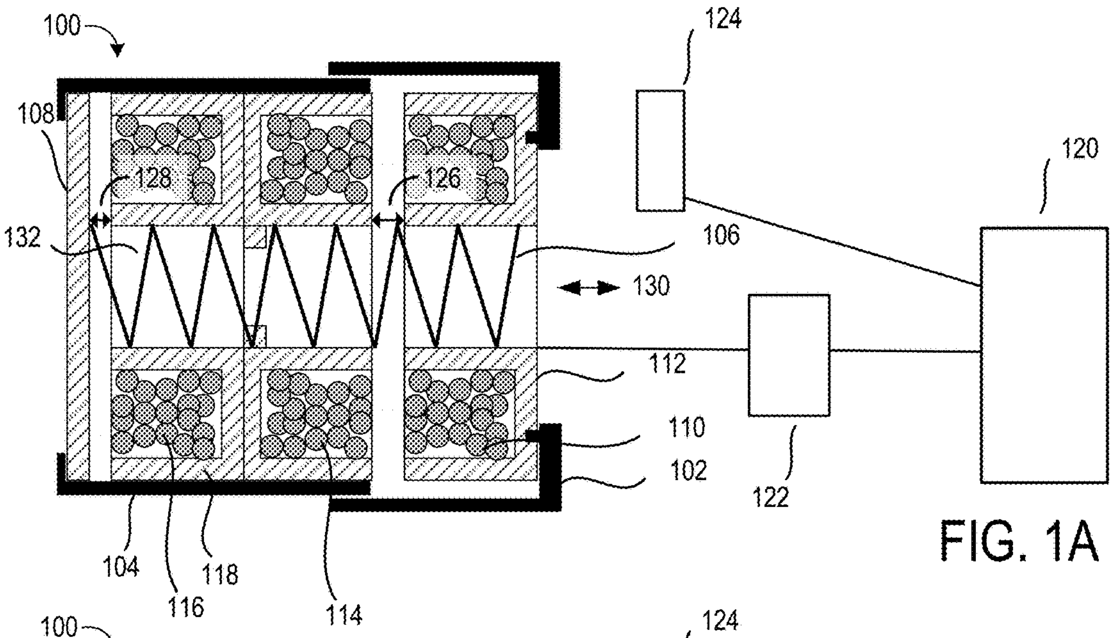
FIG. 1A, FIG. 1B, and FIG. 1C show cut-away views of a multi-stage solenoid actuator in stages of engagement and/or disengagement.
Figure 1B:
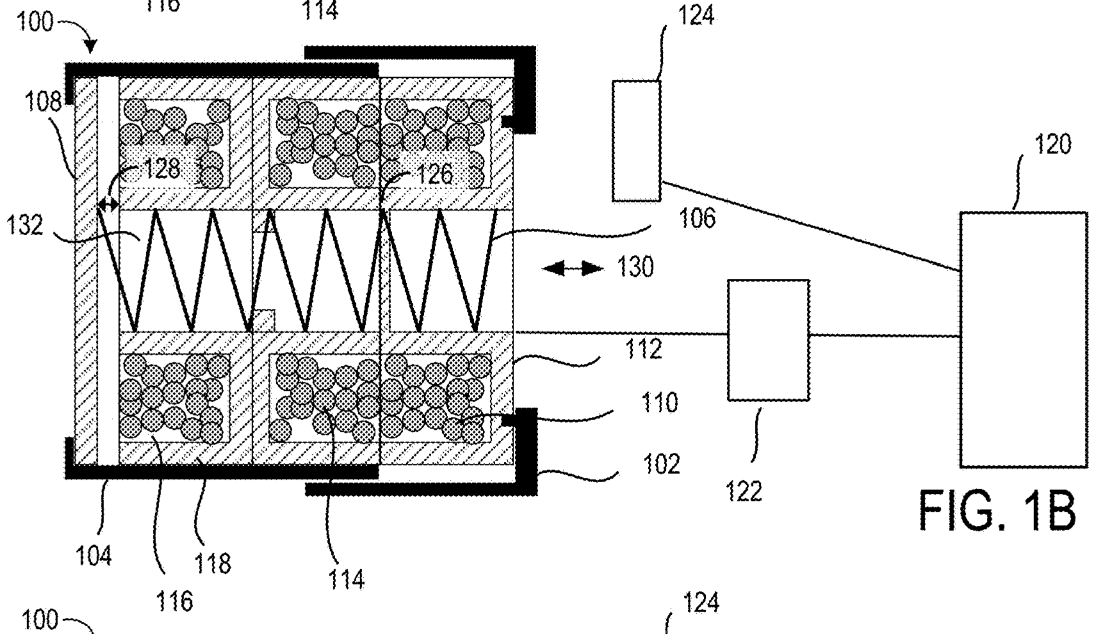
Figure 1C:
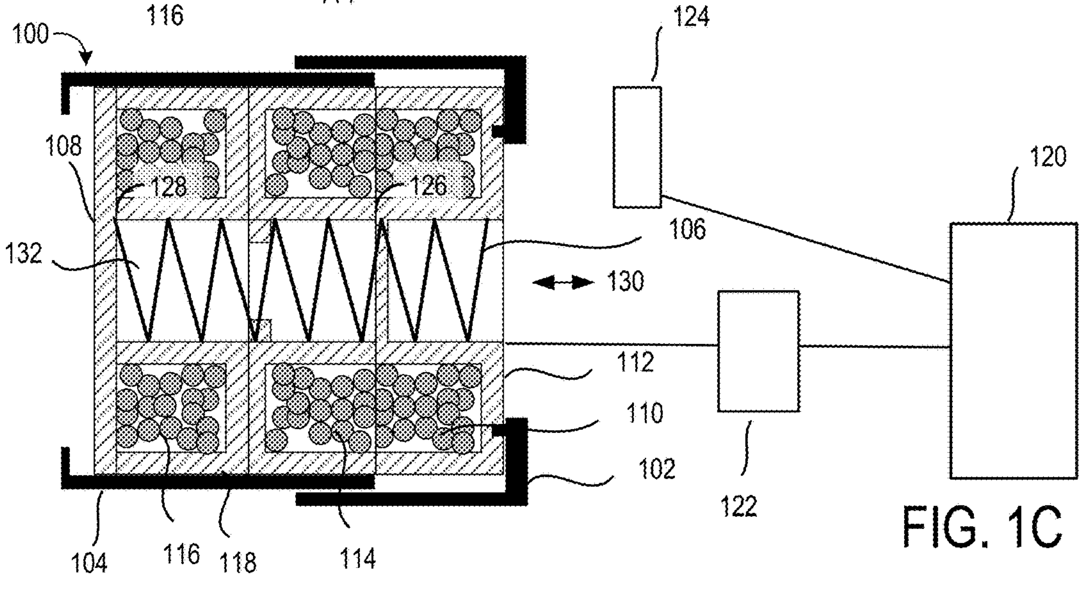
Figure 2:
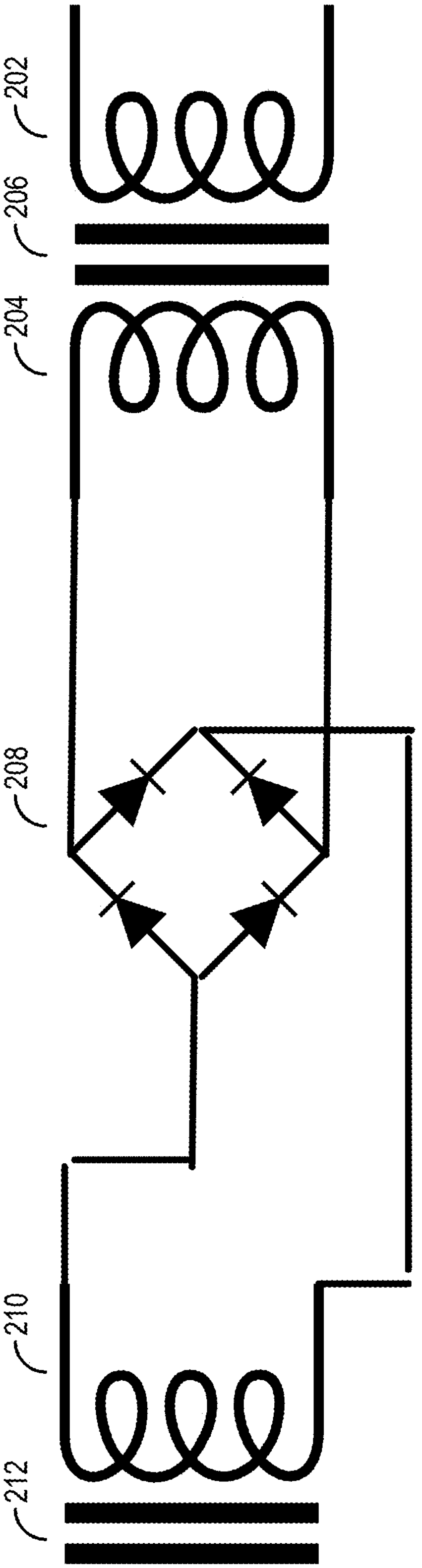
FIG. 2 shows an example electrical schematic model of the multi-stage solenoid actuator of FIG. 1A.
Figure 3:
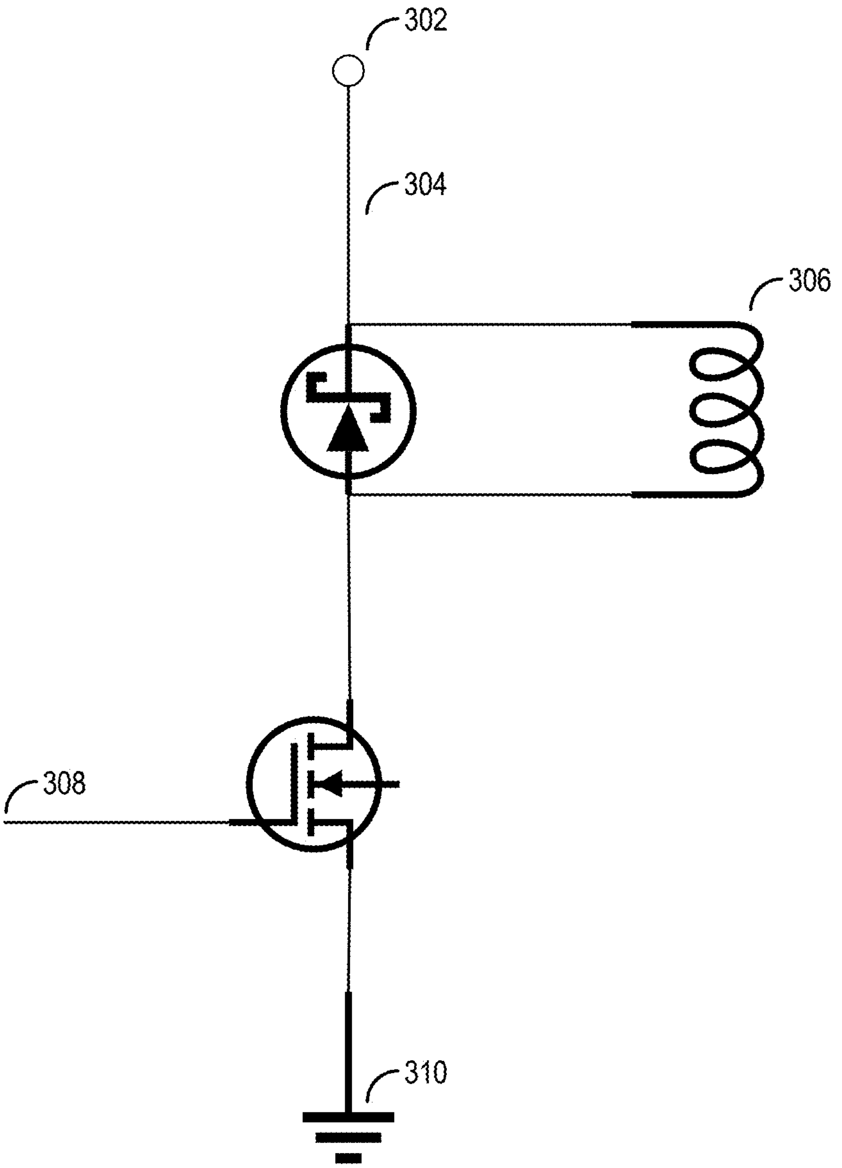
FIG. 3 shows a schematic diagram of a simplified circuit that may be used to control current to the multi-stage solenoid actuator of FIG. 1A.
Figure 4:
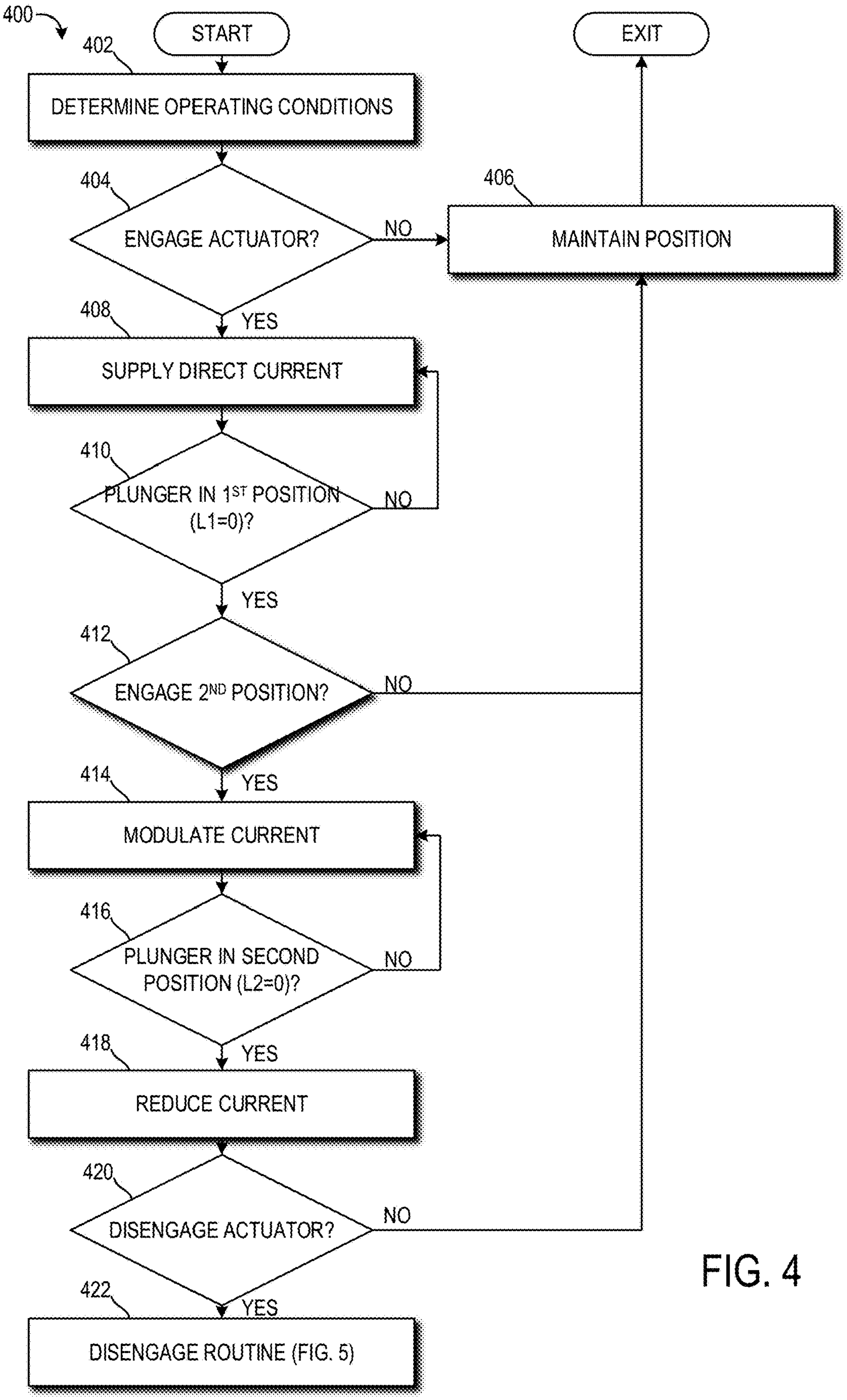
FIG. 4 shows a method for engagement of the multi-stage solenoid actuator of FIG. 1A.
Figure 5:
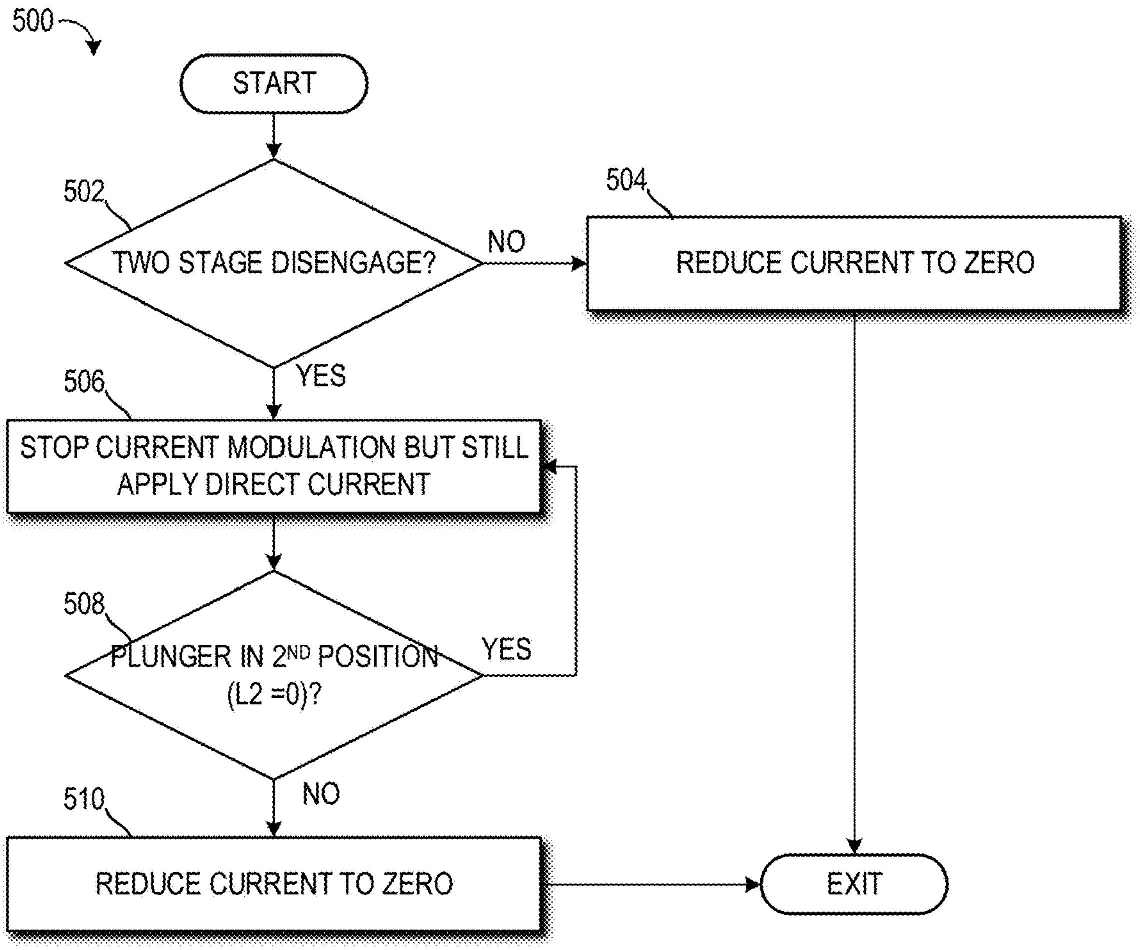
FIG. 5 shows a method for disengagement of the multi-stage solenoid actuator of FIG. 1A.

The following description relates to systems and methods for a multi-stage solenoid actuator. The solenoid actuator may be positioned in various devices, such as a pressure control solenoid for actuating a spool valve to control fluid pressure between a high pressure passage and a low pressure passage. The solenoid may be positioned in other devices, such as a three-way pneumatic valve, or a torque transmission member of a vehicle transmission. In one example, the solenoid actuator is depicted in FIGS. 1A-C in the form of a cylinder. FIGS. 1A-C depicts the multi-stage solenoid actuator in three stages of engagement: disengaged, first engagement and second engagement. FIG. 2 schematically depicts the electrical configuration of an example multi-stage solenoid actuator. FIG. 3 depicts an example control driver circuitry of the multi-stage solenoid actuator. FIGS. 4-5 detail methods of adjusting a solenoid actuator position by a control system including the various components of FIGS. 1-3. FIGS. 6-7 show timing diagrams for the adjustment of the multi-stage solenoid actuator according to the methods of FIGS. 4-5.

To achieve actuation over a certain distance, the magnetic forces are proportional to the inverse of the square of the air gap distance. For solenoids, as distance of travel increases, either a magnet must increase in size, the coil length and number of windings must increase, or the current must be increased for example. Thus, as the actuation distance increases, the size of the device generally increases disproportionately, and so the mass of the device increases, the space to hold the device increases, and more materials are needed, and therefore cost increases. An advantage of the embodiments of the multi-stage solenoid actuator is that it can provide increased actuation distance while reducing the increase in size, weight, etc. that would otherwise occur. In one example, three coils in a particular arrangement achieve significantly more displacement while retaining a single actuation line. Furthermore, reducing the number of wires is advantageous because the full range of displacement may be controlled using only a single actuation signal with reduced potential for degradation caused by connector or wire issues.

FIGS. 1A-C show a cut-away view of a multi-stage solenoid actuator 100. In one example, the actuator is cylindrical in shape. In other examples, the actuator may be configured as an annulus, rectangle, or other embodiments. In one example, the multi-stage solenoid actuator 100 may operate as a pressure control solenoid, such as to actuate a spool valve to control fluid pressure between a high pressure passage and a low pressure passage in a vehicle hydraulic system. Other embodiments may exist such as operating a three way valve or clutch in a transmission. The multi-stage solenoid actuator 100 may operate to cover discrete distances, such as via a two-step engagement and a one- or two-step disengagement. In another embodiment, the multi-stage solenoid actuator may cover a continuous range of engagement and disengagement distances. Various control strategies will be discussed in detail below.

Continuing with FIGS. 1A-C, the multi-stage solenoid actuator comprises a first housing 102, a second housing 104, a spring 106, a plunger 108. The actuator further comprises a plurality of coils. In an example, the solenoid includes a first coil, second coil, and third coil arranged in a series. In an example, the coils may include: a first actuation coil 110, a power transfer coil 114, and a second actuation coil 116. In an example, the first housing is movable relative to the second housing. The first housing may be directly fixed to a first component and the plunger directly fixed to a second component to be moved relative to the first component. The second housing may not be directly fixed to either component.

The coils may be enclosed in a coil frame. In an example, the first actuation coil 110 is partially enclosed by a first coil frame 112. The first coil frame 112 is coupled to the first housing 102. The power transfer coil 114 and second actuation coil 116 are partially enclosed jointly by a second coil frame 118. The second coil frame 118 is fixedly attached to the second housing 104. The second housing 104 is movable and can optionally rotate around a central axis 130 (indicated by arrows) relative to the first housing 102.

The second housing 104 encloses the plunger 108. The plunger 108 is displaced axially within the second housing 104 by electromagnetic force provided by the coils 110, 114 and 116. The spring 106 is disposed within central passage 132 and biases the plunger 108 in the direction opposite the electromagnetic force of the coils 110, 114, and 116. Alternatively, the spring may be biased in the opposite direction, and thus actuation would be in the opposite direction from that described in FIGS. 1A-C. In one example, the first housing 102 is fixed to a body element, such as a valve body, and the plunger 108 operates as an armature exerting a force on a spool valve, variably reducing fluid at an input pressure to an output pressure.

The multi-stage solenoid actuator of FIGS. 1A-C may be in electronic communication with a controller 120 via control circuitry 122, shown schematically (examples of which are described in more detail with regard to FIGS. 2-3). The control circuitry 122 may be in electronic communication with the controller 120 (e.g., electronic control unit (ECU)) via wired and/or wireless communication. The controller 120 may cause energization of the solenoid via current applied through the control circuitry 122 to the first actuation coil 110. In one example, there is a single electrical current input via control circuitry 122. In one example, the control circuitry 122 may include a switching device coupled to the first coil, such that a single signal to the switching device controls the total displacement of the multi-stage solenoid actuator 100. The controller 120 may be designed to implement control strategies such direct current (DC) voltage supply, modulating current (alternating current (AC)) voltage supply, and the like. In one example, the controller may be equipped with a memory for storing control strategies, such as those described herein with regard to FIGS. 4-7.

Also shown schematically is a position sensor 124 in electronic communication with the controller 120. The position sensor 124 may send signals to the controller 120 about the position of the plunger 108 (e.g. first position, second position, or disengaged). In another example, the sensor 124 may sense the plunger 108 over a range of positions continuously from fully engaged to fully disengaged. However, other suitable sensors have been envisioned. For example, the sensor may operate as a switch that indicates a simplified position. In still other example, positions may be estimated in an open loop fashion via a timer based on applied voltage and/or current over time. The position sensor 124 and controller 120 may operate in tandem to determine current in sufficient quantity and duration to engage and disengage the multi-stage solenoid actuator as described herein.

Referring now to FIG. 1A, the multi-stage solenoid actuator 100 is shown in a fully disengaged position. In full disengagement, electrical current is not supplied to the multi-stage solenoid actuator 100. The spring 106 biases axially to maximally extend the distance between the first and second housings (e.g. a first length 126) and to maximally extend the distance between the plunger 108 and the second coil frame 118 (e.g. a second length 128). In one example, the position sensor 124 detects the disengaged position of plunger 108 and communicates the plunger position to the controller 120. In one example, the sensor detects the plunger in direct contact with the second housing, e.g. a disengage threshold position. In another example, full disengagement may be estimated by a timer, wherein the timer counts the duration of stopped current to disengage the actuator, which is stored by the controller as a stopped current threshold time (e.g. 5 milliseconds (ms)).

Turning now to FIG. 1B, the multi-stage solenoid actuator 100 is shown in a first engagement position. First engagement is established by the application of a DC voltage to the first actuation coil 110 through the control circuitry 122. Current to the first actuation coil 110 creates a magnetic field that generates a magnetic force acting against the bias of the spring 106, attracting the second coil frame 118 to the first coil frame 112. Components captured by the second housing (e.g. second coil frame, plunger 108 and spring 106) are pulled closer to the first coil frame 112 by the first length 126 distance. In one example, the magnetic force draws the power transfer coil 114 and first actuation coil 110 into direct contact, thereby reducing the first length 126 distance to zero. In one example, the position sensor 124 detects the plunger 108 via sensing the first length 126 distance. The sensor may communicate detection of the first length 126 to the controller 120. The controller may determine that the first length 126 distance is equal to zero to indicate a first threshold position. In another example, first position is estimated via a countdown timer. For example, DC voltage supplied to the first actuation coil at a defined magnitude (e.g. 1 volt (V)) for a threshold time (e.g. 5 ms). The threshold magnitude and time are stored by the controller as a first position threshold. In this way, a first delay time indicates reaching the first threshold position. In an example embodiment, first engagement of the plunger 108 actuates a first stage of fluid pressure modification.

Continuing in FIG. 1B, once the first length 126 is equal to zero, such that the power transfer coil 114 and first actuation coil 110 are in direct contact, the controller 120 sends a signal to the control circuitry 122 to increase modulating current to the first actuation coil 110. In one example, the controller 120 communicates to the control circuitry 122 a desired voltage AC modulation frequency and amplitude based on a desired modulating current threshold magnitude (e.g. 1.2 A) for a desired time (e.g. 5 ms). The AC voltage is conducted through a transformer formed by the first actuation coil 110 and the power transfer coil 114 (as described further in FIG. 2). The modulated current is rectified through a bridge rectifier (not shown but see detailed in FIG. 2) and converted back to DC voltage through the second actuation coil 116.

Moving on to FIG. 1C, direct current transferred through the second actuation coil 116 creates a magnetic force which attracts the plunger 108 axially toward the second coil frame 118. The magnetic force generated by the second actuation coil 116 acts against the bias of the spring 106 and further reduces the second length 128 distance between the plunger 108 and the second coil frame 118. The magnetic force draws the plunger 108 toward the second coil frame 118 and into direct contact, thereby reducing the second length 128 distance to zero, indicating second engagement. In one example, the position sensor 124 detects the plunger 108 via the second length 128 distance. The sensor may communicate detection of the second length 128 to the controller 120. The controller may determine that the second length 128 distance is equal to zero to indicate a second threshold position. In another example, the timer counts down the duration of AC supplied to the actuator at a specific magnitude (e.g. 1 V) and time (e.g. 6 ms). The threshold time and magnitude are stored on the controller as a second position threshold. In this way, a second delay time indicates reaching the second threshold position. In an example embodiment, second engagement of the plunger 108 actuates a second stage of fluid pressure modification.

Continuing with FIG. 1C, once the second length 128 distance is equal to zero, AC voltage may be reduced to provide the minimum holding current to the multi-stage solenoid actuator 100. To reiterate, a first higher peak voltage is supplied to bring the second coil frame 118 and the plunger 108 into direct contact, after which current to the actuator may be reduced to a lower magnitude AC voltage when first length 126 distance and second length 128 distance both equal zero. In one example, the timer counts downs the duration (e.g. 3 ms) of lower AC voltage magnitude supplied to the actuator (e.g. 5 mV), this third delay indicates to the controller the second position engaged at the second, lower peak voltage. In this way, the amount of electrical current to hold the solenoids in place drops substantially when the magnetic elements are in direct contact due to the magnetic force to hold the solenoids in contact is a function of the inverse of distance squared.

In one example, the multi-stage solenoid actuator in the second engagement position (FIG. 1C) may be disengaged in a single step with the cessation of DC voltage to the first actuation coil 110. In this example, upon stopping current for sufficient duration (e.g. 3 ms), the system would return to the disengaged position (e.g., as shown in FIG. 1C) as both magnetic forces are substantially reduced to zero. Thus, the biasing force of spring 106 restores the actuator to the full disengagement position (e.g. FIG. 1A).

Additionally, the multi-stage solenoid actuator in the second position may be disengaged in two stages. In one example, the controller 120 first communicates to the control circuitry 122 to stop AC voltage to the first coil, thereby releasing the plunger 108 from the second actuation coil 116. In one example, the position sensor 124 detects the secondary length extension, signaling to the controller 120 that the multi-stage solenoid actuator is in the first engagement position (e.g. FIG. 1B). The controller 120 then communicates to stop DC voltage to the first actuation coil, ceasing contact between the first coil frame 112 and the second coil frame 118. As above, the biasing force of spring 106 restores the multi-stage solenoid actuator to the fully disengaged position (e.g. FIG. 1A). In addition to discrete staged engagement and disengagement, the multi-stage solenoid actuator may cover a range of distances. Example control strategies are detailed in FIGS. 4-7.

In FIG. 2, an electrical schematic for a multi-stage solenoid actuator is depicted, such as the multi-stage solenoid actuator 100 in FIGS. 1A-C. The multi-stage solenoid actuator of FIG. 2 comprises a first actuation coil 202, a power transfer coil 204, and a second actuation coil 210. The first actuation coil 202 is electrically isolated from the power transfer coil 204 and the second actuation coil 210. The power transfer coil 204 and second actuation coil 210 are electrically connected via a bridge rectifier 208.

FIG. 2 shows first length 206 and second length 212, which are at their maximum lengths when the multi-stage solenoid actuator is fully disengaged and are at their minimum lengths (e.g. second length 212 distance is equal to 0) when the actuator is in the second engagement position. The energized first actuation coil 202, functions as a first solenoid, drawing the power transfer and second actuation coils in tandem (as described in FIGS. 1A-B) via a magnetic force. When first length 206 is equal to zero, current modulation is increased. The first actuation coil 202 and the power transfer coil 204 in direct contact form a transformer when modulated current is applied.

The bridge rectifier 208 is included to convert the modulated current to the transformer formed by the first actuation coil 202 and power transfer coil 204 back to a direct current through the second actuation coil 210. In this way, the power transfer coil 204 and second actuation coil 210 in tandem function as a second solenoid drawing an armature, such as the plunger 108 of FIGS. 1A-C, into a second actuation stage. Thus energy transfer between the first actuation coil 202 to the power transfer and second actuation coils 204, 210 occurs via magnetic flux. Rectified direct current from the second actuation coil 210 draws the plunger (not shown; see FIGS. 1A-C) via magnetic flux, that is, without additional circuitry. Multi-stage electrification through a single circuit may be desirable for the benefits related to minimizing the cost to produce original parts, the cost to repair, and overall reduced component complexity. Other embodiments may include a single input circuit and a grounded circuit, but the general benefit of fewer electrical inputs in retained.

FIG. 3 depicts a simplified current control driver circuit that modulates the current to the first coil. The control driver circuit comprises a supply voltage 302, control circuitry 304, first actuator coil 306, current modulation signal 308, and plunger 310. To draw the second coil frame towards the first coil frame, first energize the first actuator coil 306 with unmodulated current from supply voltage 302 via control circuitry 304. Once touching, the current is modulated to establish the transformer function. The modulated signal 308 reduces the amount of current via the first actuator coil 306, but once in direct contact, lower AC current will maintain the contact. In one example, the simplest control of the system involves turning on DC to one voltage known to establish connection between the first actuator coil and transformer coil, then modulate at a fixed amplitude. However, in other examples the current to the first actuator coil could be set at another voltage within a range to control intermediate distances. Upon establishment of the transformer, amplitude of modulation may be controlled to actuate further intermediate distances. Once the first length distance and the second length distance are both equal to zero (e.g. FIG. 1C), current to the first actuator coil 306 can be reduced.

Turning now to FIG. 4, the method 400 details the adjustment of desired plunger position of the multi-stage solenoid actuator, and may be implemented by the components described above in FIGS. 1-3. The method 400 may be carried out by a controller including non-transitory instructions stored in memory and in conjunction with signals received from sensors of the multi-stage solenoid actuator, such as the sensor 124 of FIGS. 1A-C, and other sensors of the system. In one example, the method 400 uses the controller (e.g. controller 120 of FIG. 1) to communicate current supply to a control circuit (e.g. control circuitry 122 of FIGS. 1A-C). In one example, the controller carries out the method 400 incorporating plunger position information from a sensor (e.g. sensor 124 of FIGS. 1A-C) or using an estimated plunger position, such as based on an open-loop estimate using the actuation current signal and a model of the actuator. The method 400 may be carried out in a pressure control system, actuating a spool valve with discrete pressure states, for example. In another example, the method 400 may be carried out in a three-way air valve system, where discrete engagement stages actuate first and second positions of a bar valve.

The method 400 starts at 402, where the operating conditions are determined. The operating conditions will vary based on the system within which operates the multi-stage solenoid actuator. In one example, operating conditions may include system hydraulic and/or pneumatic pressure, and/or temperature of the various components of the solenoid (e.g. the spring 106 and/or the control circuitry 122 of FIGS. 1A-C). The operating conditions may be determined via one or more sensors.

The method 400 proceeds to 404 where the method includes determining whether engagement of the actuator is desired. For instance, an operator may actuate a button, or other input device, indicating the operator's desire to engage the multi-stage solenoid actuator. In an example, the controller may engage the actuator in response to a signal from a hydraulic pressure control system sensor indicating a pressure below a threshold (e.g. 1000 pounds per square inch (psi), 1500 psi, 2500 psi, etc.).

If engagement of the multi-stage solenoid actuator is not desired, the method 400 proceeds to 406 where the positon of the actuator is maintained and the method 400 is exited.

If engagement of the multi-stage solenoid actuator is desired, the method 400 proceeds to 408, where DC voltage is supplied to the multi-stage solenoid actuator. As depicted in FIGS. 1-3, DC voltage may be supplied to the multi-stage solenoid actuator via a single input circuit electrically connected to the first actuation coil (e.g. first actuation coil 110). In one example, the controller signals the control circuitry to apply a calibrated current magnitude for a calibrated duration, e.g. 1 V is supplied for 5 ms. In another example, a controller learns and stores instructions for appropriate magnitudes and durations of current indexed with threshold values of the various sensors in a system. For example, the controller may signal the circuitry to apply a current magnitude and duration (e.g. 1 V for 5 ms) when a spring temperature sensor detects a spring temperature below a threshold temperature (e.g. 80° C.) and may signal a shorter magnitude and/or duration (e.g. 8 mV for 5 ms) when sensor detects temperature in excess of the spring temperature threshold. In one example, the spring temperature sensor detects the spring temperature is 75° C., and thus the controller signals to the control circuitry to apply 8 mV of current for 5 ms. Further, the level of the DC current may be adjusted to provide different position control between fully disengaged and the first threshold position. Further still, the level of the DC current may be adjusted during the movement of the plunger from fully disengaged to the first threshold position, for example, decreasing gradually over time.

The method 400 proceeds next to 410 where the system determines whether the plunger is in the first threshold position. In one example, the position sensor detects the direct contact of the first actuation coil and the power transfer coil (e.g. first length 126 distance=0, such as in FIG. 1B), and then communicates the plunger position to the controller. In another example, following the supply of a calibrated current magnitude and duration, a timer indicates the plunger is in the first engagement position.

If the plunger is not in the first engagement position, the method 400 returns to 408 where current at a greater voltage and/or for a longer duration is supplied.

If the plunger is in the first position, the method 400 continues to 412 where the method includes determining whether second engagement of the actuator is desired. As above, an operator may actuate a button, or other input device, indicating the operator's desire to engage the second position. In another example, the controller may engage the actuator second position following a signal from a hydraulic pressure control system sensor indicating a pressure below a second threshold (e.g. 1500 psi).

If it is determined the second position of the actuator is not desired, the method 400 proceeds to 406 where the present position is maintained.

If it is determined the second position of the actuator is desired, the method 400 proceeds to 414, where current to the multi-stage solenoid actuator is modulated. In one example, the controller signals to the control circuitry a calibrated AC voltage to apply to the first actuation coil for a calibrated duration. In one example, the multi-stage solenoid actuator is calibrated to engage second position with 1 V of AC voltage sustained for at least for 5 ms. Additionally or alternatively, a controller may signal the control circuitry to apply a calibrated magnitude and duration of AC upon receipt of signals indicating various system sensor threshold values. For example, the controller may signal the circuitry to apply a current magnitude and duration (e.g. 1 V for 5 ms) when a fluid temperature sensor detects a fluid temperature above a threshold (e.g. 40° C.) and may signal a longer magnitude and/or duration (e.g. 1 V for 1 second) when sensor detects fluid temperature below the threshold.

From 414, the method 400 proceeds to 416, where the system determines whether the plunger is in the second threshold position. In one example, a plunger position sensor detects the direct contact of the plunger and the second coil frame (e.g. second length 128 distance=0, such as in FIG. 1C), then signals the controller the plunger position.

If the plunger is not in the second threshold position, the method 400 returns to 414 where AC voltage to first coil is supplied at a greater magnitude and/or duration.

If the plunger is in second threshold position, the method 400 proceeds to 418, where AC voltage to the multi-stage solenoid actuator may be reduced. In one example, the lowest current to hold the actuator in the second position may be stored on the controller. For example, upon detection of the plunger in second position, the sensor may signal to the controller that a lower AC voltage may be supplied. The controller may then signal to the circuitry the lower AC voltage to apply to the first actuation coil. In one example, the lowest current to apply AC to the coil may be stored in controller memory and based on various system sensors. For example, lower AC voltage may be set to 3 mV when the hydraulic pressure sensor detects pressure stabilized at 1500 psi for more than 15 seconds.

From 418, the method 400 proceeds to 420 where the system determines whether disengagement of the actuator is desired. If the system does not desire disengagement, the method proceeds to 406 where the present position is maintained.

Returning to 420, the method 400 proceeds to 422 where the disengage routine is followed in FIG. 5.

FIG. 5 depicts the method 500, a subroutine of the method 400, following the decision to disengage the solenoid actuator. In an example of the method, adjustment of desired plunger position may involve a single or two discrete steps to fully disengage. In different example, disengagement may occur over gradual distances.

FIG. 5 begins at 502 where the system determines whether a two stage disengagement is desired. In one example, an operator may actuate a button, or other input device, indicating the operator's desire for one or two stage disengagement. In another example, a controller (e.g. controller 120 of FIGS. 1A-C), in communication with various sensors in the system, may store threshold values that initiate a one or two stage disengagement. Such as, a hydraulic pressure system sensor may signal to the controller a hydraulic pressure in excess of a pressure threshold (e.g. 2500 psi) initiating a one stage disengagement.

If it is determined at 502 two stage disengagement is not desired, the method 500 proceeds to 504 where current is reduced to zero. As depicted in FIGS. 1-3, a single circuit provides current to the multi-stage solenoid actuator. Stopping DC voltage to the first coil breaks the contact between the first coil frame and the second coil frame and allows the spring to return the plunger to the fully disengaged position via a single signal. In one example, current may be stopped abruptly or more gradually. An abrupt stop may include DC voltage reduced to 0 V over 1 ms, and an example gradual disengage, current may be reduced to 0 V at a rate of 2 mV/s. In this way, a single electrical signal may initiate full disengagement.

Returning to 502, if it is determined that two stage disengagement is desired, the method 500 proceeds to 506 where current modulation is stopped but direct current is still applied. In this case, as depicted in FIGS. 1-3, the power transfer coil acts as a transformer when AC voltage is supplied. Therefore, no magnetic force is generated to attract the plunger to the second coil frame. In one example, AC voltage may be stopped abruptly, such as reduced to 0 V over 1 ms. Alternatively, it may be reduced more gradually, such as reduced to 0 V at a rate of 2 mV/s.

Following from 506, the method 500 proceeds to 508 where the system determines whether the plunger is in the second position (e.g. FIG. 1C). As above, a plunger position sensor may indicate the position of the plunger. If the plunger remains in the second threshold position, the method proceeds to 506 where it continues to attempt to stop current modulation but apply direct current.

Returning to 508, if the system determines that the plunger is not in the second threshold position (e.g. L2>0), the method proceeds to 510 where current is reduced to zero. In one example, current to the coil is reduced by 2 mV increments per ms until zero. In one example, full disengagement is confirmed by a position sensor detecting the first length distance (e.g. 126 of FIG. 1A). The plunger position sensor signals to the controller that the multi-stage solenoid actuator is in the fully disengaged position. In this way, the reduction of DC voltage to zero following the stop of AC voltage disengages the multi-stage actuator in two discrete, consecutive stages.

In FIGS. 4 and 5, example plunger position sensors are described. In one example, plunger position may be detected by sensors positioned at the contacts between the first coil frame and second coil frame, and between the plunger and the second coil frame. Such sensors may signal to the controller real-time plunger position, including first engagement, second engagement and disengaged. Additionally or alternatively, similar position sensors could signal to the controller continuous positions in between first engagement, second engagement, and disengagement. Additionally or alternatively, the plunger position may be estimated via a timer. In one example, instructions stored on the controller may communicate to the circuitry to apply DC at 1 V for 1 minute. The timer counts down the time and communicates to the controller first threshold position engagement based on the duration of current supplied. Second engagement may operate similarly, where a countdown timer indicates to the controller when AC has been supplied for a sufficient duration (e.g. 1.2 V for 1 minute). In another example, a position sensor may operate as a switch with one position or another, such that not proceeding to the second threshold position indicates current supplied was not sufficient to engage the first position. In this case, and in the others, if the desired position of engagement or disengagement is not obtained after a sufficient duration or stopping of current, the method may start over.

Figure 6B:
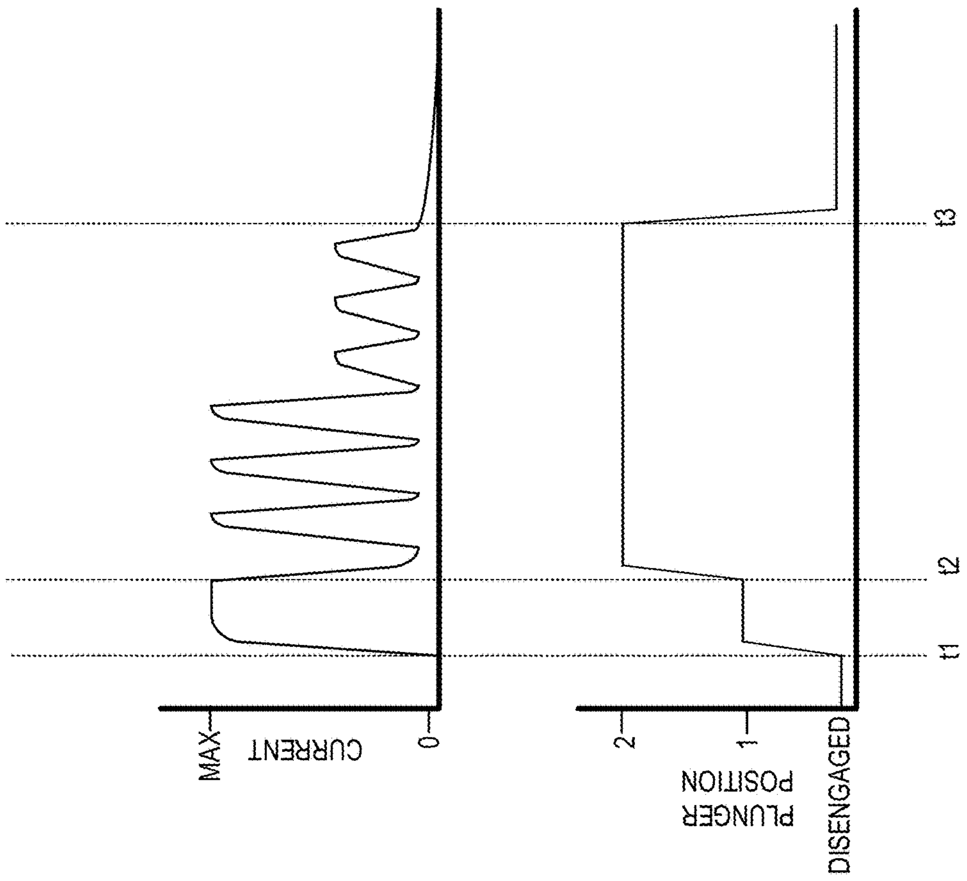
FIGS. 6A and 6B show timing diagrams for example prophetic operations to engage and disengage the multi-stage solenoid actuator of FIG. 1A.
Figure 6A:
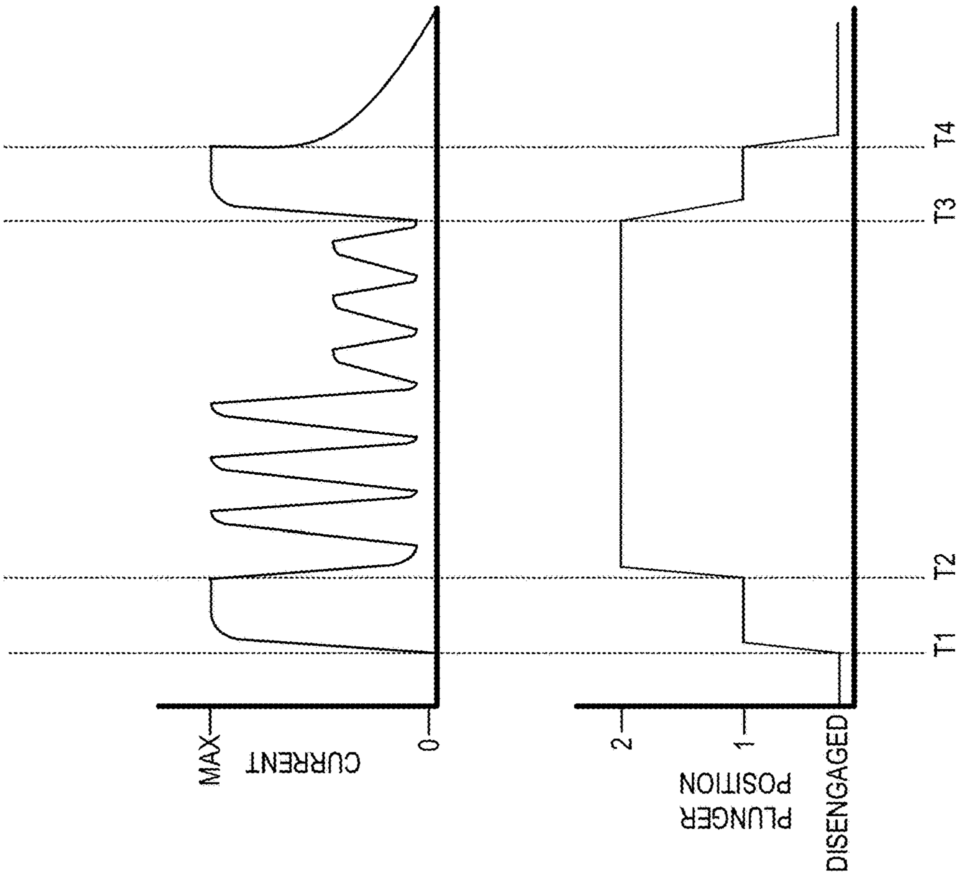
Figure 7:
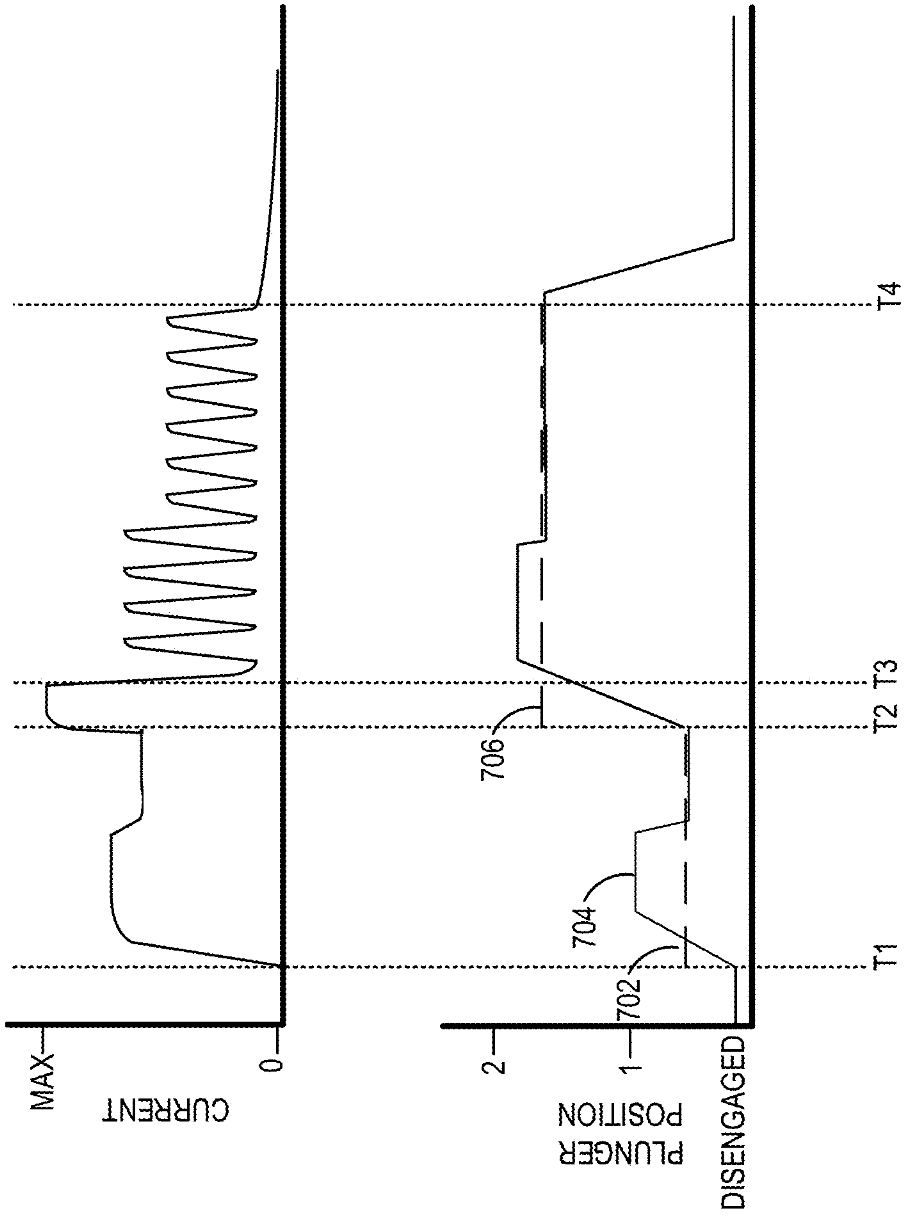
FIG. 7 shows a timing diagram of an example prophetic operation to engage and disengage the multi-stage solenoid actuator of FIG. 1A.

FIGS. 6A and 6B, shows timing diagrams 600 and 650 for example prophetic operation of a multi-stage solenoid actuator according to the methods of FIGS. 4-5. The horizontal (x-axis) denotes time and the vertical markers t1-t3 identify relevant times in the routines of FIGS. 4, 5 engaging the multi-stage solenoid actuator. The upper plots in FIGS. 6A and 6B depict current levels, wherein zero denotes no current supplied to the actuator and max denotes the amount of current that establishes direct contact between the first and second coil frames (e.g. L1=0 in FIG. 4). The lower plots depict plunger position, wherein disengaged denotes the spring maximally extended and plunger in direct contact with the second housing (e.g. FIG. 1A), 1 denotes the first engagement position (e.g. FIG. 1B), and 2 denotes the second engagement position (e.g. FIG. 1C). In one example, plunger position is determined by plunger position sensors positioned to detect first engagement, second engagement, and disengagement, and are in communication with the controller.

Starting with FIG. 6A, prior to t1, the multi-stage solenoid actuator is in a disengaged state (e.g. FIG. 1A). In one example, beginning at t1, the system determines engagement of the actuator is desired, as in FIG. 4, such as a request to actuate a hydraulic pressure control valve. In one example, at t1, the hydraulic pressure sensor detects a pressure and signals the controller. The valve pressure is below a threshold, e.g. below 1500 psi, indicating to the controller to engage the first stage. The controller communicates to the control circuitry to apply direct current to the coil at the max level, 1 V for 5 ms. The plunger position transitions from the disengaged position to the first position (e.g. FIG. 1B). In one example, the plunger in first position is indicated by the sensor detecting the first length 126 of FIGS. 1A-C equal to zero. In another example, DC voltage of a known magnitude supplied for a threshold time indicates to controller that the plunger in the first engagement position. For example, from a 1 V of DC voltage supplied for 2 ms, the controller may estimate the first engagement position.

At t2, a request to engage the second position is determined. In one example, the hydraulic pressure sensor signals to the controller valve pressure below a second threshold, e.g. 1200 psi, which causes the controller to engage the second position. Modulating current to the coil is depicted in the upper plot after t2. In one example, the controller may communicate to the control circuitry to apply 8 mV for 4 ms to engage the second position. In one example, the position sensor detects second length equal to zero, indicating to the controller the plunger in second position. In another example, AC voltage supplied for a threshold time measured by a countdown timer indicates the plunger in second position. For example, from a supply of 8 mV of AC voltage for 4 ms, the controller may estimate the second engagement position.

Continuing in t2, once the plunger is in the second position, the AC voltage may be reduced to a minimum holding level. In one example, the controller communicates to the circuitry to reduce and hold at a threshold AC modulation frequency and amplitude stored in the controller memory, such as hold at 3 mV. In one example, if the amplitude is reduced below the level that retains the actuator in second engagement, the amplitude may be increased until the plunger is again detected in second position.

At t3, the system determines that disengagement from the second position to the first position is desired (e.g. a two stage disengagement, such as described in FIG. 4). In one example, the pressure sensor of a hydraulic pressure control valve detects pressure exceeding a third pressure threshold, such as exceeding 2000 psi, initiating the disengagement to the first position of the valve. After t3, modulation is stopped while direct current continues to be supplied to the coil, as described in FIG. 5. In the lower plot, the plunger is restored to the first position.

At t4, the system determines that a transition to full disengagement is desired. In one example, the pressure sensor of a hydraulic pressure control valve detects pressure exceeding a fourth pressure threshold, such as 2500 psi. In one example, upon receiving the pressure signal, the controller may initiate the full disengagement of the valve. After t4, direct current to the coil is cut. As described in FIG. 5, direct current may be cut abruptly or gradually. In one example, current is reduced at a rate of 1 mV per ms until zero. In the lower plot, the position sensor indicates the plunger is fully disengaged.

FIG. 6B proceeds in the same manner as FIG. 6A, wherein engagement of the plunger involves two stages: first DC voltage to engage the first position and AC voltage to engage the second position. Also as in FIG. 6A, following second engagement, AC voltage may be reduced while the actuator remains in the second position.

FIG. 6B differs from 6A at t3, where the system determines that full disengagement is desired (e.g. a one stage disengagement, such as described in FIG. 5). In one example, the pressure sensor of a hydraulic pressure control valve communicates to the controller pressure exceeding a further pressure threshold, such as exceeding 2800 psi, initiating full disengagement of the valve. After t3, direct current to the coil is stopped, as described in FIG. 5. In one example, current may be reduced to 0 V over 1 ms. The biasing force of the spring restores the plunger to the fully disengaged position. In this way, a single signal actuates the full distance of the valve in one step.

FIG. 7, shows timing diagrams 700 for example prophetic operation of a multi-stage solenoid actuator following an alternative example to the methods of FIGS. 4-5 and feature adjustment of intermediate modes of engagement. The horizontal (x-axis) denotes time and the vertical markers t1-t3 identify relevant times during operation of the multi-stage solenoid actuator. The upper plot depicts current level, wherein zero denotes no current to the actuator and max denotes the amount of current that establishes direct contact between the first and second coil frames (e.g. L1=0 in FIG. 4). The lower plot depicts plunger position, wherein disengaged denotes the spring maximally extended and the plunger in direct contact with the second housing (e.g. FIG. 1A), 1 denotes the first engagement position (e.g. FIG. 1B), and 2 denotes the second engagement position (e.g. FIG. 1C). In the lower plot, the horizontal hashed plot lines denote intermediate (non-discrete) modes of engagement desired by the system. The solid horizontal plot line 704 denotes the plunger position. In one example, the plunger position is detected in real-time by sensors in the multi-stage solenoid actuator and position is signaled to the controller for precise control of engagement position.

In the lower plot before t1, the multi-stage solenoid actuator is in the fully disengaged position. In one example, at t1, line 702, the system determines an intermediate level of first engagement (e.g. a first mode) is desired. In one example, a hydraulic pressure sensor detects pressure below a threshold, such as below 800 psi, and signals the controller (e.g. controller 120 of FIGS. 1A-C). The controller may store voltage levels to engage various stages of the actuator based on sensors in the system including pressure, temperature, fluid viscosity, etc. In this example, the controller communicates to the control circuitry (e.g. control circuitry 122 of FIGS. 1A-C) to apply direct current at 6.5 mV based on instructions stored in memory, which in the upper plot is 65% of maximum current.

In the lower plot of FIG. 7, line 704, following the supply of direct current at 6.5 mV, the plunger position exceeds the desired level of first engagement as detected by the plunger position sensor. The plunger position sensor signals the controller the plunger is at 90% of first engagement. The controller communicates to the control circuitry to reduce the magnitude of current to the actuator to 5 mV (e.g. 50% of maximum current). In the lower plot, line 704, following the reduction of current, the plunger position sensor detects the plunger in the desired position (shown slightly lower than the threshold 702 in FIG. 7). The controller to holds the current at 5 mV.

At t2 line 706, the system determines an intermediate mode of second engagement is desired (e.g. a second mode). In one example, a hydraulic pressure sensor detects pressure below a second threshold, such as below 500 psi, and signals the controller. Following t2, the upper plot shows current supplied at the maximum DC voltage. In one example, the maximum DC voltage is 1 V and is supplied to multi-stage solenoid actuator via communication to the control circuitry by the controller based on instructions stored in memory. In the lower plot following t2, line 704 crosses the first engagement position indicating the first and second coil frames in direct contact, such that second engagement may proceed (e.g. first length 126=0, FIG. 1B).

Following t3 in the upper plot, modulated current is applied to the actuator. In one example, the AC voltage applied to the actuator is based on instructions stored in memory that indexes AC voltages with various system thresholds. In one example, a spring temperature sensor detects the spring is <80° C. and signals the controller, which communicates to the control circuitry to apply 6 mV of AC voltage to reach line 706 (or 60% of maximum current voltage). Following the lower plot, line 704, with the initial supply of current the plunger position is detected at 80% of second engagement, more engaged than desired as detected by the plunger second position sensor (e.g. measured at second length 128 in FIGS. 1A-C). Continuing in this example, the controller receives a signal from the plunger position sensor. The controller communicates to the control circuitry to reduce the amplitude of AC voltage to the actuator to 5 mV (or 50% of maximum current). Following the reduction of AC voltage, in the lower plot, plunger position line 704 matches line 706. Plunger position is communicated to the controller, and the present AC voltage level may be maintained.

At t4, the system determines full disengagement of the multi-stage solenoid actuator is desired. In one example, a hydraulic pressure sensor detects pressure above a threshold (e.g. 2500 psi) and signals the controller. After t4, current to coil is stopped. As depicted in FIG. 5, stopped current to the actuator stops magnetic flux between plunger and the second coil frame, and the second coil frame and the first coil frame. Thus, via one signal full disengagement of the multi-stage actuator may occur. In one example, current to the coil is reduced by 3 mV increments per ms until zero. In one example, full disengagement is confirmed by a plunger position sensor, which detects the plunger in direct contact with the second housing due to the biasing force of the spring. The plunger position sensor signals to the controller that the multi-stage solenoid actuator is in the fully disengaged position.

The systems and methods described herein have the technical effect of increasing the ranged control of a solenoid actuator due to coils configured in a series. The systems and methods described herein may further have the technical effect of increasing the ranged control of a solenoid actuator using only a single electrical signal.

FIGS. 1-3 how example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements coaxial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Elements having a continuous shape may be referred to as such, in on example. Further in another example, elements having a monolithic shape may be referred to as such. As used herein, the terms “substantially” and “approximately” are construed to mean plus or minus five percent or less of the range or value unless otherwise specified.

The disclosure also provides support for a solenoid actuator, comprising, a first coil, a second coil, and a controller including non-transitory instructions stored in memory that cause the controller to apply a voltage to the first coil and draw the second coil toward the first coil, and then increase modulation of the voltage with the second coil engaged with the first coil to form a transformer.

In a first example of the system, the system further comprises: a first housing coupled to the first coil, and a second housing coupled to the second coil, the first housing movable relative to the second housing.

In a second example of the system, optionally including the first example, the system further comprises: a third coil fixedly coupled to the second coil.

In a third example of the system, optionally including one or both of the first and second examples, the system further comprises: a plunger coupled with the second housing, and a spring coupled between the plunger and the first housing.

In a fourth example of the system, optionally including one or more or each of the first through third examples, the voltage applied to the first coil to draw the second coil toward the first coil is unmodulated.

In a fifth example of the system, optionally including one or more or each of the first through fourth examples, the voltage applied to the first coil with the first coil engaged with the second coil is modulated at a first higher peak voltage to draw the plunger toward the first coil and the second coil, and then modulated at a second, lower peak voltage to hold the plunger after it is drawn toward the first coil and the second coil.

In a sixth example of the system, optionally including one or more or each of the first through fifth examples, the system further comprises: a switching device coupled to the first coil.

The disclosure also provides support for a method of adjusting a solenoid actuator position of a solenoid actuator between a first position and a second position, the solenoid actuator having a first coil and a second coil, comprising: applying a DC voltage to the first coil to draw the second coil toward the first coil, after the second coil is in direct contact with the first coil to form a transformer, applying an AC voltage to the first coil to generate current in a third coil that moves a plunger.

In a first example of the method, the method further comprises, after moving the plunger, applying a lower AC voltage to the first coil to generate lower current in the third coil that holds the plunger.

In a second example of the method, optionally including the first example, the method further comprises: switching from the DC voltage to the AC voltage based on a first threshold position of the plunger.

In a third example of the method, optionally including one or both of the first and second examples, the method further comprises: switching from the DC voltage to the AC voltage based on a first delay.

In a fourth example of the method, optionally including one or more or each of the first through third examples, the method further comprises: switching from the AC voltage to the lower AC voltage based on a second threshold position of the plunger.

In a fifth example of the method, optionally including one or more or each of the first through fourth examples, the method further comprises: switching from the AC voltage to the lower AC voltage based on a second delay.

In a sixth example of the method, optionally including one or more or each of the first through fifth examples, the method further comprises: switching from the AC voltage to the lower AC voltage based on a third delay.

In a seventh example of the method, optionally including one or more or each of the first through sixth examples, the method further comprises: during a first mode, adjusting an amount of the DC voltage based on plunger position to achieve a desired plunger position, and during a second mode, adjusting an amount of the AC voltage based on plunger position to achieve the desired plunger position.

The disclosure also provides support for a method of adjusting a solenoid actuator position of a solenoid actuator between a first position and a second position, the solenoid actuator having a first coil and a second coil, comprising: applying a DC voltage to the first coil to draw the second coil toward the first coil against a bias, after the second coil is in direct contact with the first coil to form a transformer, applying an AC voltage to the first coil to generate current in a third coil that moves a plunger further against the bias, and after moving the plunger, applying a lower AC voltage to the first coil to generate lower current in the third coil that holds the plunger.

In a first example of the method, the method further comprises: switching from the DC voltage to the AC voltage based on a first threshold position of the plunger.

In a second example of the method, optionally including the first example, the method further comprises: switching from the DC voltage to the AC voltage based on a first delay.

In a third example of the method, optionally including one or both of the first and second examples, the method further comprises: switching from the AC voltage to the lower AC voltage based on a second threshold position of the plunger.

In a fourth example of the method, optionally including one or more or each of the first through third examples, the method further comprises: switching from the AC voltage to the lower AC voltage based on a second delay.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies. As such, various commands, operations, and/or actions described herein may be performed in the sequence illustrated, in tandem, or in some cases omitted. Likewise, the order of processing is provided for ease of description and is not necessarily required to achieve the features and advantages of the examples described herein. One or more of the actions, operations, and/or functions, described herein may be repeatedly performed depending on the particular strategy being used. Further, the described actions, operations, and/or functions may graphically represent code to be programmed into non-transitory memory of the computer readable storage medium in a differential control system, where the described actions are carried out by executing the instructions in a system including the various hardware components in combination with the electronic controller.

It will be appreciated that the configurations and routines disclosed herein are exemplary in nature, and that these specific examples are not to be considered in a limiting sense, because numerous variations are possible. For example, the above technology may be applied to motor systems with different configurations and in a vehicle with a variety of propulsion sources such as motors, engines, combinations thereof, etc. Moreover, the terms "first," "second," "third," and the like are not intended to denote any order, position, quantity, or importance, but rather are used merely as labels to distinguish one element from another, unless explicitly stated to the contrary. The subject matter of the present disclosure includes all novel and non-obvious combinations and sub-combinations of the various systems and configurations, and other functions, features, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither excluding nor requiring two or more such elements. Other combinations and sub-combinations of the disclosed features, functions, elements, and/or properties may be claimed through amendment of the present claims or through presentation of new claims in this or a related application. Such claims, whether narrower, broader, equal, or different in scope to the original claims, also are regarded as included within the subject matter of the present disclosure.

The invention claimed is:

1. A solenoid actuator, comprising;

a first coil;

a second coil; and a controller including non-transitory instructions stored in memory that cause the controller to apply a voltage to the first coil and draw the second coil toward the first coil, and then increase modulation of the voltage with the second coil engaged with the first coil to form a transformer.

2. The solenoid actuator of claim 1, further comprising a first housing coupled to the first coil, and a second housing coupled to the second coil, the first housing movable relative to the second housing.

3. The solenoid actuator of claim 2, further comprising a third coil fixedly coupled to the second coil.

4. The solenoid actuator of claim 3, further comprising a plunger coupled with the second housing, and a spring coupled between the plunger and the first housing.

5. The solenoid actuator of claim 1, wherein the voltage applied to the first coil to draw the second coil toward the first coil is unmodulated.

6. The solenoid actuator of claim 4, wherein the voltage applied to the first coil with the first coil engaged with the second coil is modulated at a first higher peak voltage to draw the plunger toward the first coil and the second coil, and then modulated at a second, lower peak voltage to hold the plunger after it is drawn toward the first coil and the second coil.

7. The solenoid actuator of claim 1, further comprising a switching device coupled to the first coil.

8. A method of adjusting a solenoid actuator position of a solenoid actuator between a first position and a second position, the solenoid actuator having a first coil and a second coil, comprising:

applying a DC voltage to the first coil to draw the second coil toward the first coil;

after the second coil is in direct contact with the first coil to form a transformer, applying an AC voltage to the first coil to generate current in a third coil that moves a plunger.

9. The method of claim 8 further comprising, after moving the plunger, applying a lower AC voltage to the first coil to generate lower current in the third coil that holds the plunger.

10. The method of claim 9 further comprising switching from the DC voltage to the AC voltage based on a first threshold position of the plunger.

11. The method of claim 9 further comprising switching from the DC voltage to the AC voltage based on a first delay.

12. The method of claim 9 further comprising switching from the AC voltage to the lower AC voltage based on a second threshold position of the plunger.

13. The method of claim 9 further comprising switching from the AC voltage to the lower AC voltage based on a second delay.

14. The method of claim 9 further comprising switching from the AC voltage to the lower AC voltage based on a third delay.

15. The method of claim 9 further comprising during a first mode, adjusting an amount of the DC voltage based on plunger position to achieve a desired plunger position; and during a second mode, adjusting an amount of the AC voltage based on plunger position to achieve the desired plunger position.

16. A method of adjusting a solenoid actuator position of a solenoid actuator between a first position and a second position, the solenoid actuator having a first coil and a second coil, comprising:

applying a DC voltage to the first coil to draw the second coil toward the first coil against a bias;

after the second coil is in direct contact with the first coil to form a transformer, applying an AC voltage to the first coil to generate current in a third coil that moves a plunger further against the bias; and after moving the plunger, applying a lower AC voltage to the first coil to generate lower current in the third coil that holds the plunger.

17. The method of claim 16 further comprising switching from the DC voltage to the AC voltage based on a first threshold position of the plunger.

18. The method of claim 17 further comprising switching from the DC voltage to the AC voltage based on a first delay.

19. The method of claim 18 further comprising switching from the AC voltage to the lower AC voltage based on a second threshold position of the plunger.

20. The method of claim 19 further comprising switching from the AC voltage to the lower AC voltage based on a second delay.

* * * * *